(12) United States Patent
Park et al.

(10) Patent No.: US 10,516,828 B2
(45) Date of Patent: Dec. 24, 2019

(54) MOBILE TERMINAL AND CONTROL METHOD THEREOF

(71) Applicant: LG ELECTRONICS INC., Seoul (KR)

(72) Inventors: Mihyun Park, Seoul (KR); Jongbeom Kim, Seoul (KR); Hyukjae Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 462 days.

(21) Appl. No.: 14/794,630

(22) Filed: Jul. 8, 2015

(65) Prior Publication Data

US 2016/0127652 A1    May 5, 2016

(30) Foreign Application Priority Data

Oct. 30, 2014    (KR) .................... 10-2014-0149588

(51) Int. Cl.
*G06F 3/048*    (2013.01)
*H04N 5/232*    (2006.01)
(Continued)

(52) U.S. Cl.
CPC ....... *H04N 5/23293* (2013.01); *G06F 3/0488* (2013.01); *G06F 3/04817* (2013.01);
(Continued)

(58) Field of Classification Search
CPC .... G06F 3/0481; G06F 3/0484–04845; H04N 5/23245
See application file for complete search history.

(56) References Cited

U.S. PATENT DOCUMENTS

| | | | |
|---|---|---|---|
| 6,104,397 A | 8/2000 | Ryan et al. | |
| 2002/0054017 A1* | 5/2002 | Agata | G06F 1/1616 345/157 |

(Continued)

FOREIGN PATENT DOCUMENTS

| | | |
|---|---|---|
| GB | 2350991 | 12/2000 |
| JP | 2008-086023 | 4/2008 |
| WO | 2013/174076 | 11/2013 |

OTHER PUBLICATIONS

Home button or back button to leave an app? [Apr. 7, 2013]. On Stackexchange: Android enthusiasts. Retrieved Aug. 14, 2019, from https://android.stackexchange.com/questions/43176/home-button-or-back-button-to-leave-an-app. (Year: 2013).*

(Continued)

*Primary Examiner* — Matthew Ell
*Assistant Examiner* — Linda Huynh
(74) *Attorney, Agent, or Firm* — Lee, Hong, Degerman, Kang & Waimey

(57) ABSTRACT

A mobile terminal and a control method thereof are disclosed. The mobile terminal includes a display, and a controller configured to display, on the display, a home screen on which at least one icon is displayed, to execute an application corresponding to an icon selected from the at least one icon, and to display at least one of a shape, color and size of the at least one icon depending on an execution environment of the application. According to the present invention, a user can intuitively recognize an execution state of an application since an icon corresponding to the application can be displayed differently according to application execution environments.

17 Claims, 26 Drawing Sheets

(51) Int. Cl.
  *G06F 3/0481* (2013.01)
  *G06F 3/0488* (2013.01)
  *H04M 1/725* (2006.01)
  *G06F 3/0484* (2013.01)
  *H04N 5/247* (2006.01)
  *G06F 3/0483* (2013.01)

(52) U.S. Cl.
  CPC .... *G06F 3/04847* (2013.01); *H04M 1/72583* (2013.01); *H04N 5/232* (2013.01); *H04N 5/247* (2013.01); *G06F 3/0483* (2013.01); *H04M 2250/52* (2013.01)

(56) References Cited

U.S. PATENT DOCUMENTS

| | | | | |
|---|---|---|---|---|
| 2004/0264952 A1* | 12/2004 | Oeda | ................. | H04N 5/23245 396/287 |
| 2006/0072028 A1* | 4/2006 | Hong | ................. | H04N 5/23216 348/333.01 |
| 2008/0180549 A1* | 7/2008 | Lee | ....................... | G03B 19/26 348/231.2 |
| 2008/0307364 A1* | 12/2008 | Chaudhri | .............. | G06F 3/0483 715/836 |
| 2009/0327958 A1* | 12/2009 | Lung | ................. | H04M 1/72563 715/810 |
| 2010/0058193 A1* | 3/2010 | Sherrard | ............. | G06F 3/04817 715/738 |
| 2011/0138314 A1* | 6/2011 | Mir | ....................... | G06F 3/0484 715/779 |
| 2011/0296339 A1* | 12/2011 | Kang | ................. | G06F 3/04815 715/782 |
| 2012/0054686 A1* | 3/2012 | Joo | ..................... | G06F 3/04886 715/835 |
| 2012/0105579 A1* | 5/2012 | Jeon | ..................... | H04N 5/2258 348/38 |
| 2012/0151394 A1 | 6/2012 | Locke | | |
| 2012/0260217 A1* | 10/2012 | Celebisoy | ........... | G06F 3/04815 715/836 |
| 2012/0287071 A1* | 11/2012 | Wang | .................... | G06F 3/0486 345/173 |
| 2013/0086523 A1* | 4/2013 | Imamura | ............... | G06F 3/0488 715/810 |
| 2013/0163023 A1* | 6/2013 | Tomono | ............. | H04N 1/00392 358/1.13 |
| 2013/0238973 A1* | 9/2013 | Chang | ................. | G06F 3/04883 715/234 |
| 2013/0283275 A1* | 10/2013 | Kim | ........................ | G06F 9/445 718/100 |
| 2014/0245203 A1* | 8/2014 | Lee | ..................... | G06F 3/04817 715/765 |
| 2014/0317572 A1* | 10/2014 | Park | .................... | G06F 3/04817 715/835 |
| 2015/0319364 A1* | 11/2015 | Jin | ..................... | H04N 5/23245 348/220.1 |
| 2015/0346989 A1* | 12/2015 | Lee | ........................ | G06F 9/4443 715/771 |
| 2016/0014322 A1* | 1/2016 | Kimura | .............. | H04N 5/23206 348/211.2 |
| 2016/0077708 A1* | 3/2016 | Han | ....................... | G06F 3/0482 715/846 |

OTHER PUBLICATIONS

European Search Report issued in Application No. 15184004.8, dated Jun. 6, 2016, 11 pages.
European Patent Office Application Serial No. 15184004.8, Search Report dated Feb. 26, 2016, 7 pages.

* cited by examiner

FIG. 10
(a) 11a 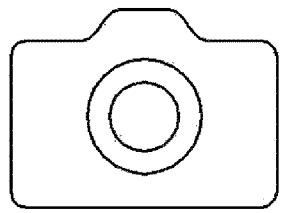
(b) 12a 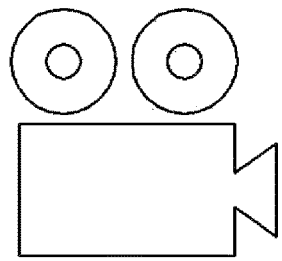
↑ Still Image
↓ Movie

FIG. 11
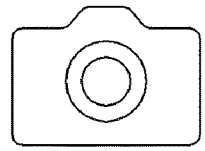 
(a) Capturing an image via a front camera
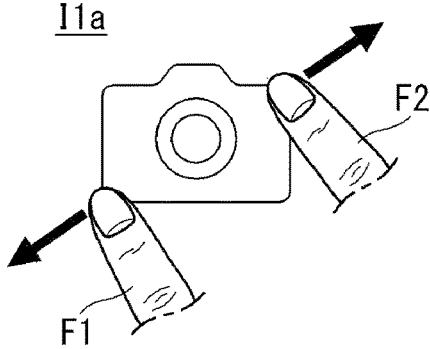
(b)
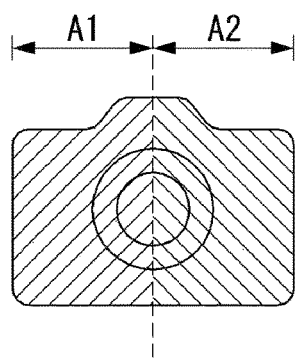 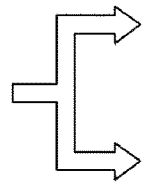
(c) Capturing an image via a front camera
Capturing an image via a rear camera

FIG. 12
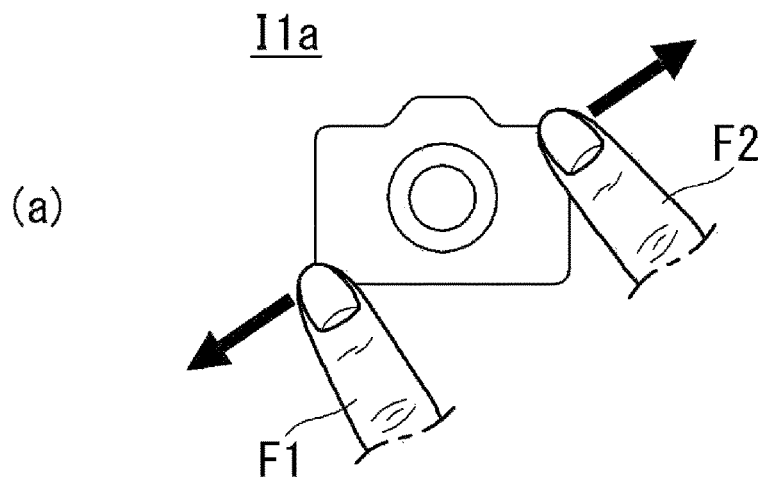
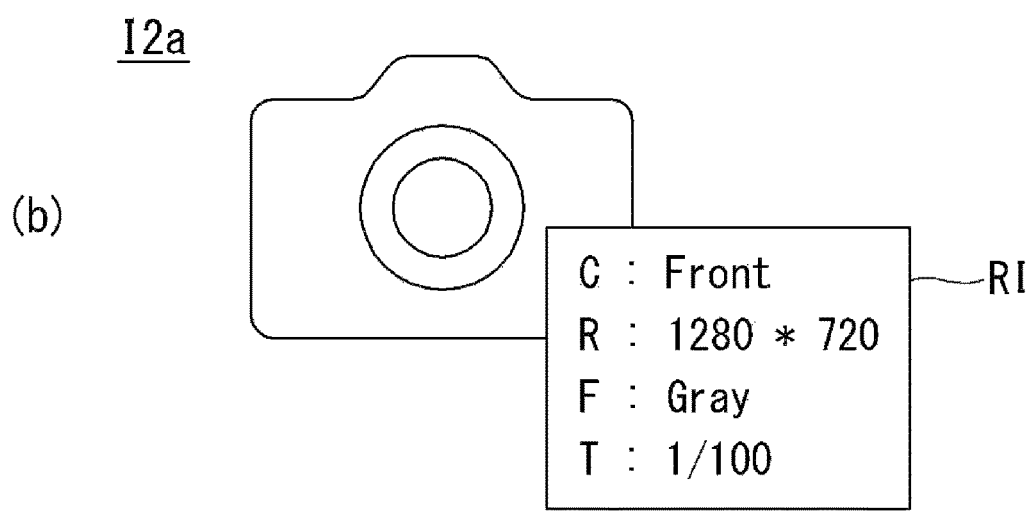

11a

→ One touch :
  - Executing the camera app.

→ Two touch :
  - Changing a camera setting to a 1st value

→ Three touch :
  - Changing a camera setting to a 2nd value

FIG. 15
(a) 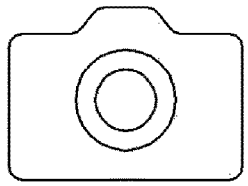 ⇨ Using a front camera
(b) 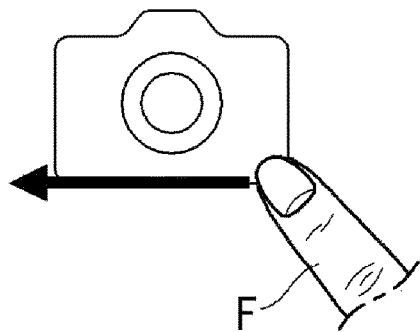
(c) 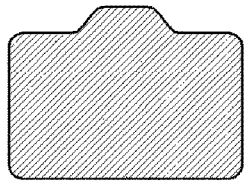 ⇨ Using a rear camera

FIG. 18
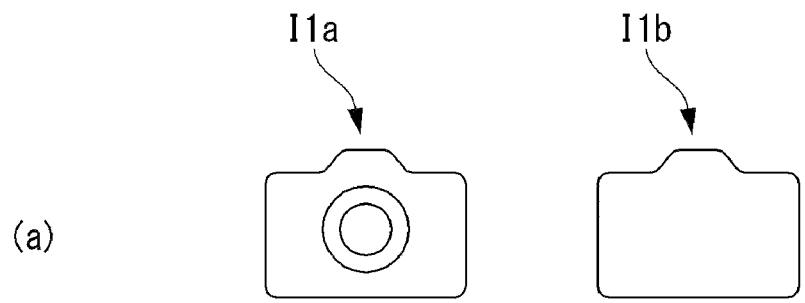
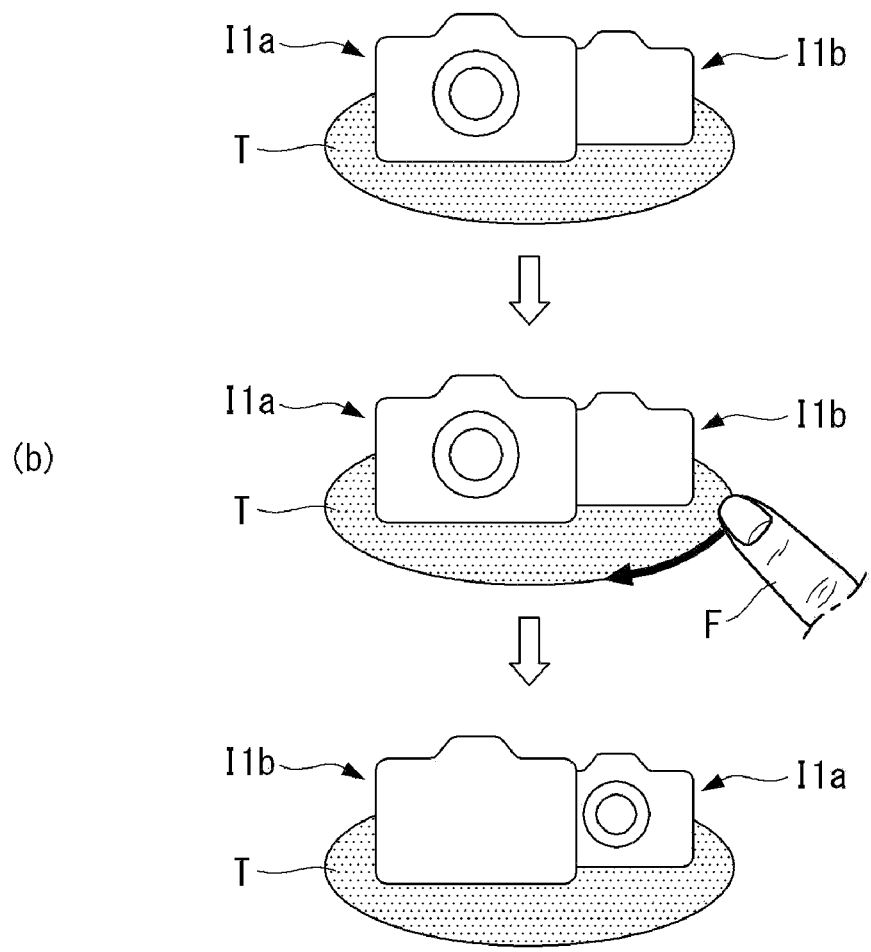

FIG. 20
(a) I1a 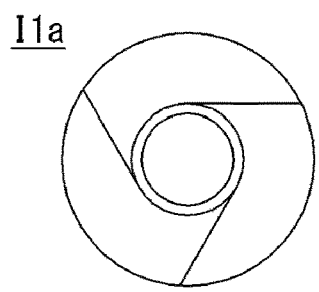
151 — BP
(b) I1b 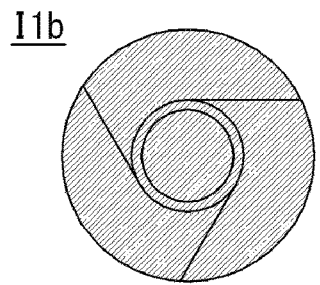
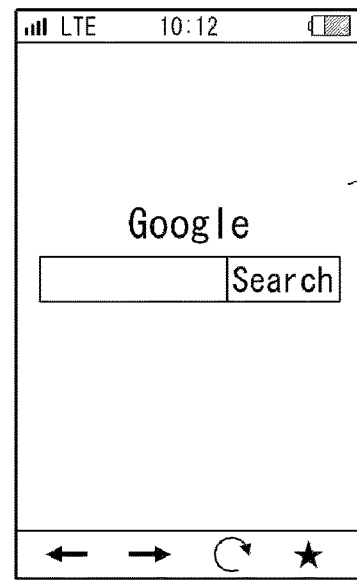
151 — HP

FIG. 21
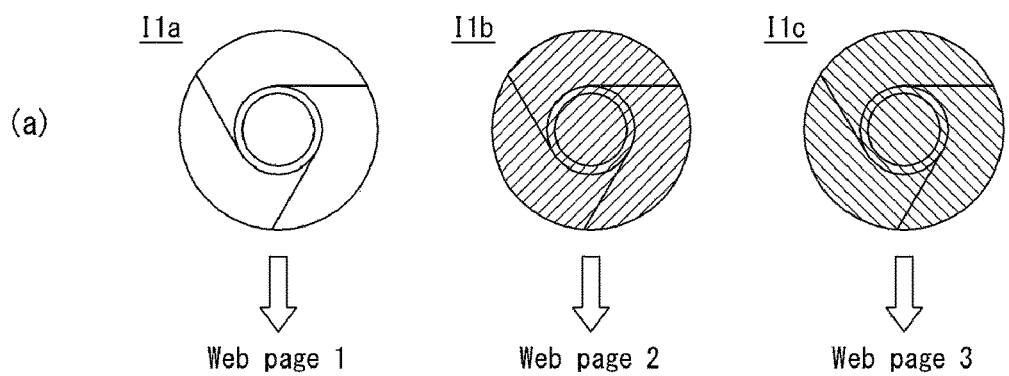
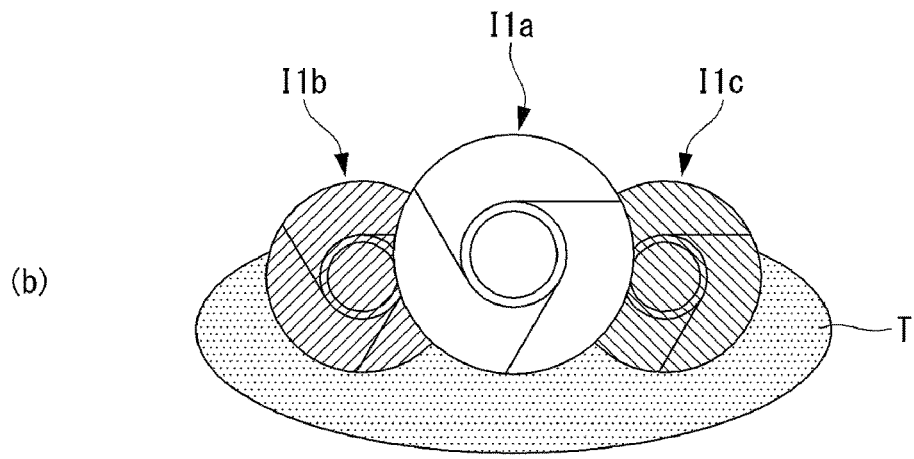

FIG. 23
(a) 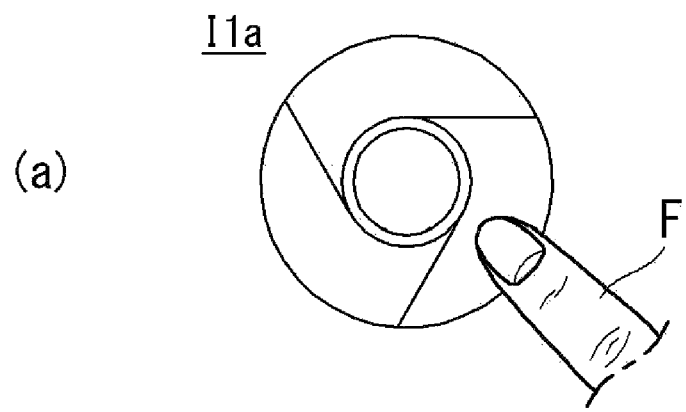
(b) 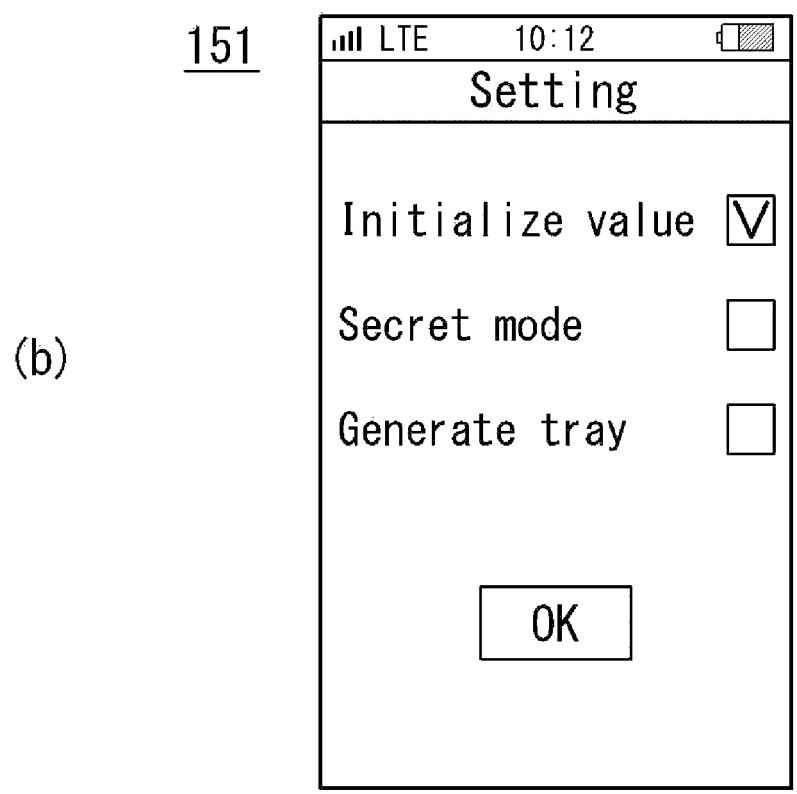

FIG. 24
(a) 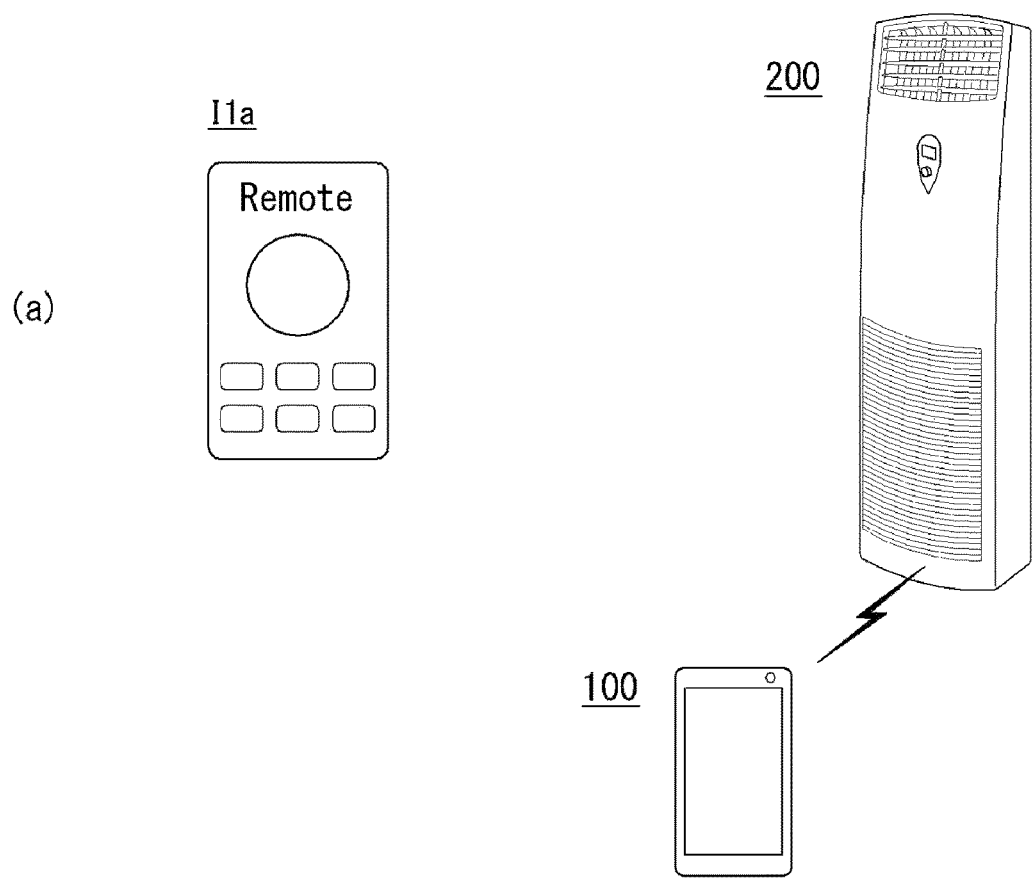
(b) 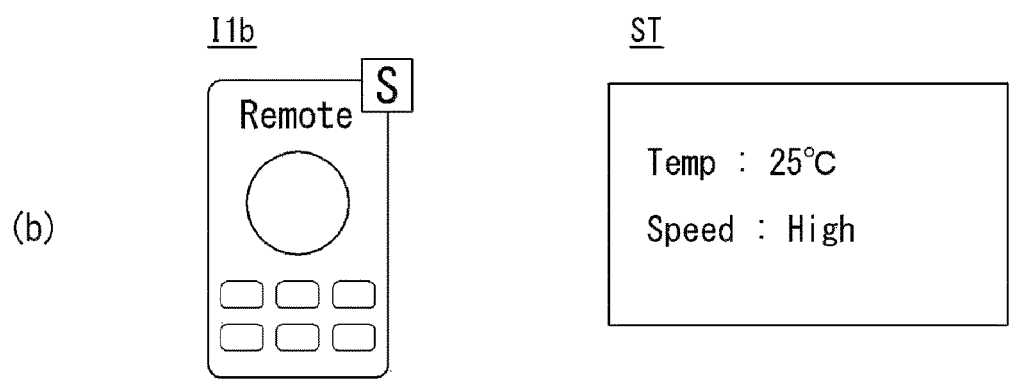

MOBILE TERMINAL AND CONTROL METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2014-0149588, filed on Oct. 30, 2014, the contents of which are all hereby incorporated by reference herein in its entirety.

TECHNICAL FIELD

The present invention relates to a mobile terminal and, more particularly, to a mobile terminal configured to enable a user to intuitively recognize an execution state of an application by differently displaying an icon corresponding to the application according to application execution environments, and a method for controlling the same.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

The present invention provides a mobile terminal configured to enable a user to intuitively recognize an execution state of an application by differently displaying an icon corresponding to the application according to application execution environments, and a method for controlling the same.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 9 to 19 illustrate manipulation of the mobile terminal camera shown in FIG. 3 and the icon corresponding thereto;

FIGS. 20 to 23 illustrate an operation corresponding to another application of the mobile terminal shown in FIG. 3; and FIG. 24 illustrates an operation corresponding to another application of the mobile terminal shown in FIG. 3.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1A:
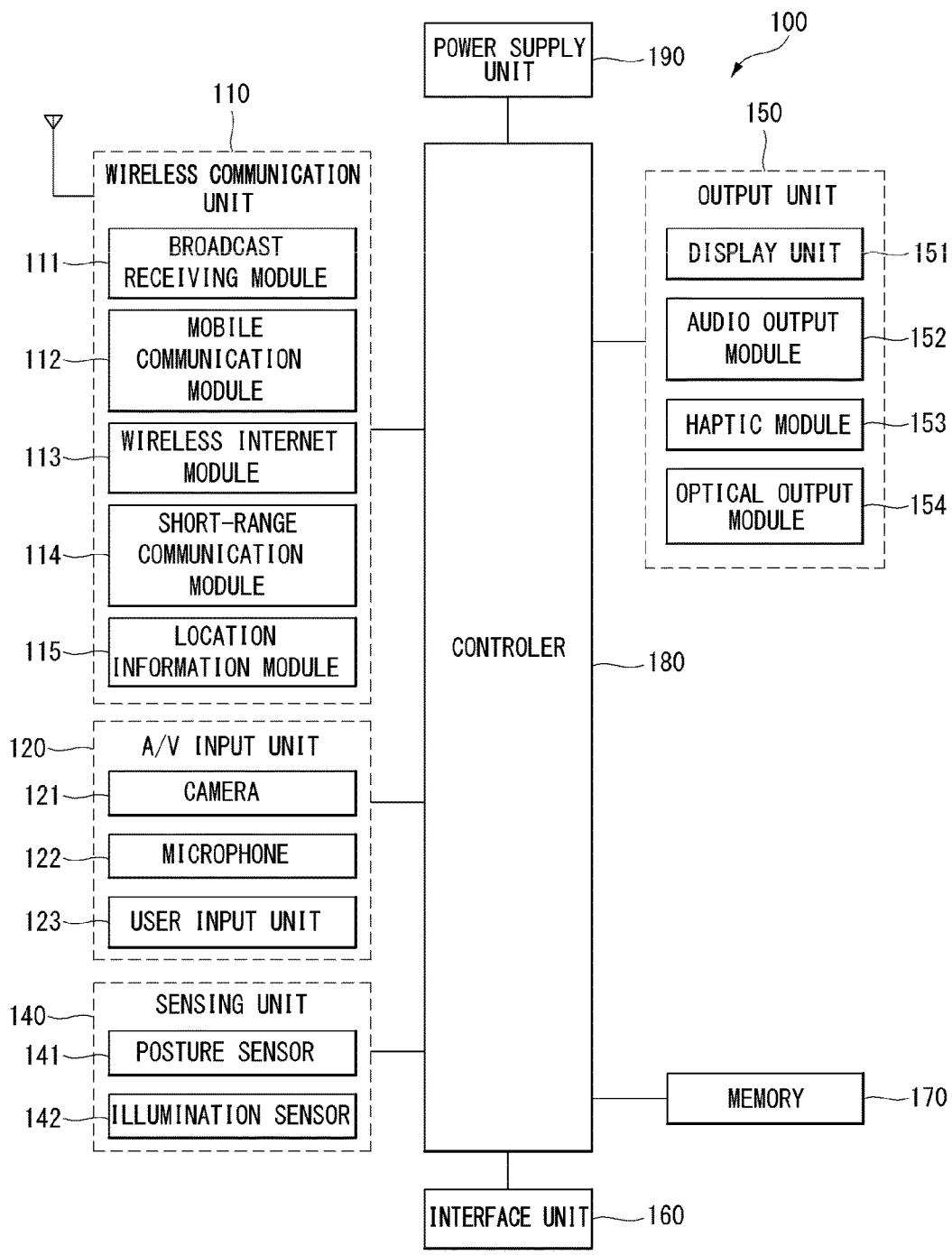
FIG. 1A is a block diagram of a mobile terminal according to an embodiment.

FIG. 1A is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1A may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk.

The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 1B:
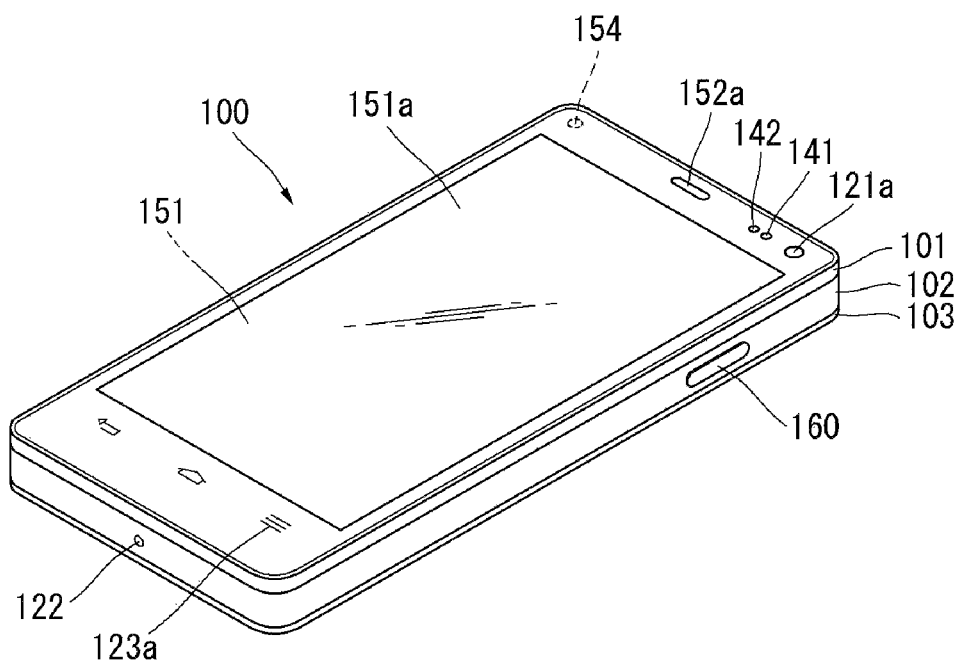
FIG. 1B is a front perspective view of the mobile terminal according to an embodiment.

FIG. 1B is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 1C:
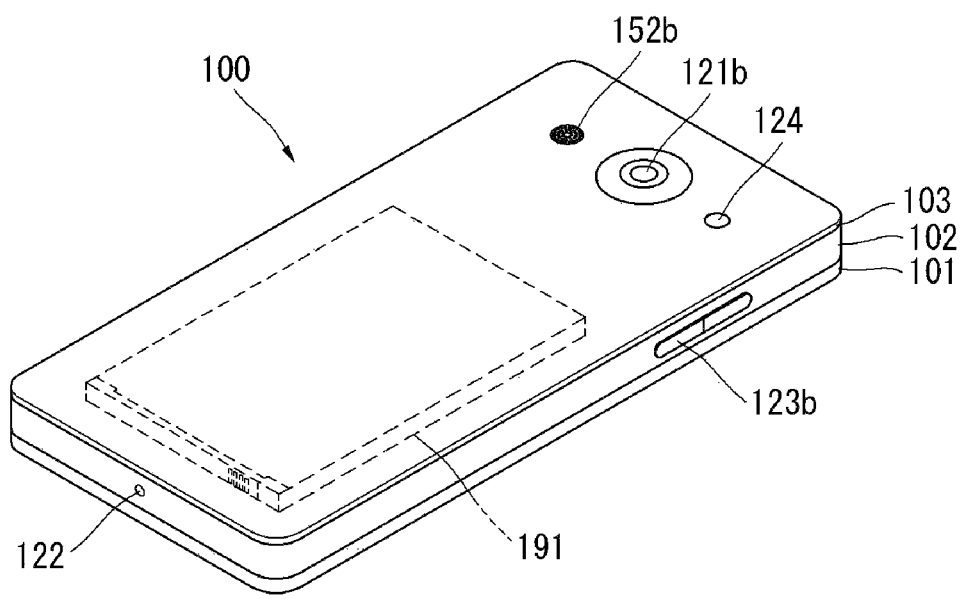
FIG. 1C is a rear perspective view of the mobile terminal according to an embodiment.

FIG. 1C is a rear perspective view of the mobile terminal (shown in FIG. 1B) according to an embodiment.

Referring to FIG. 1B, a camera 121' may be additionally attached to the rear side of the terminal body (i.e., the rear case 102). The camera 121' may have a photographing direction opposite to that of the camera 121 (shown in FIG. 1B) and may have pixels different from those of the camera 121 (shown in FIG. 1B).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 1B) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1A) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
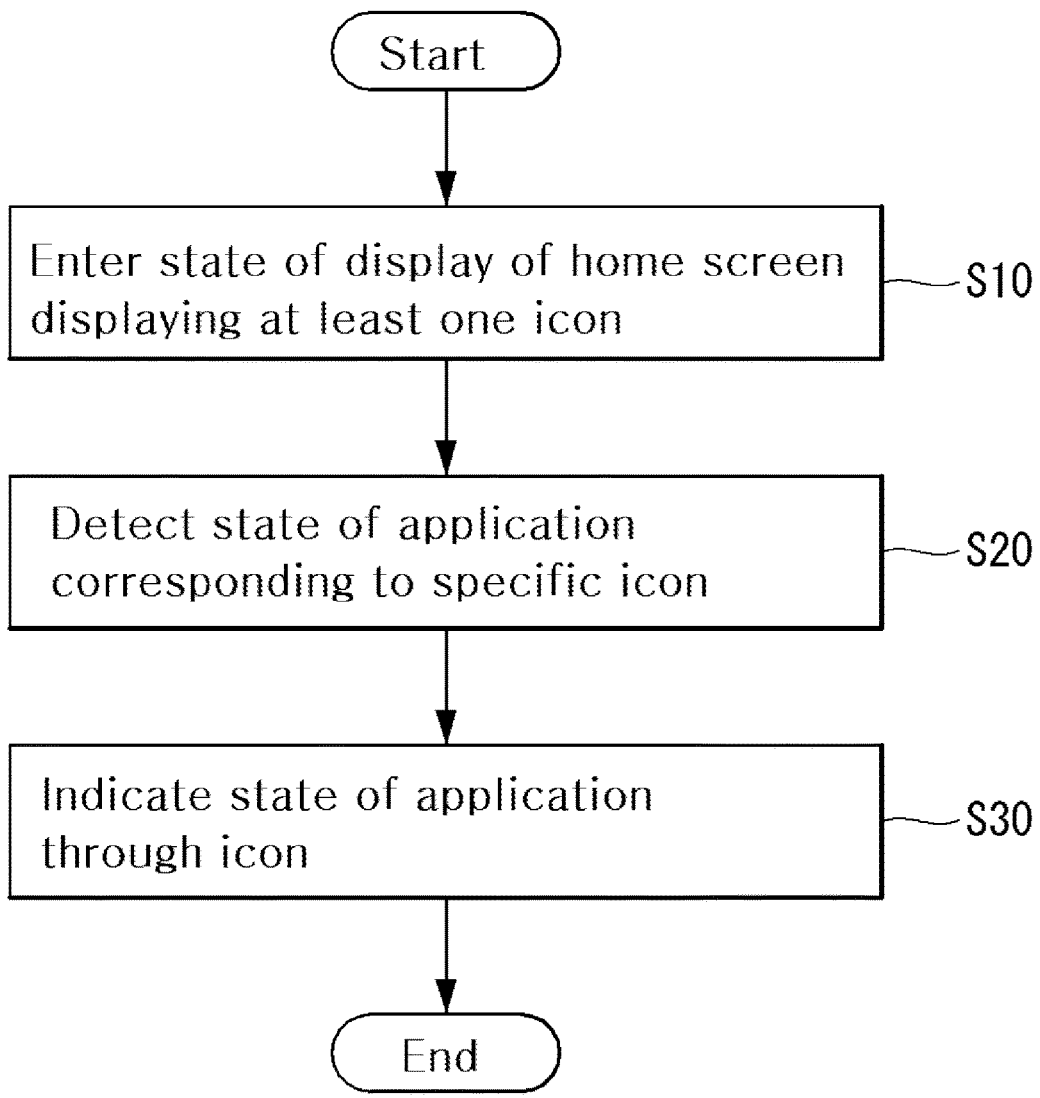
FIG. 3 is a flowchart illustrating an operation of the mobile terminal according to an embodiment of the present disclosure.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

Figure 2:
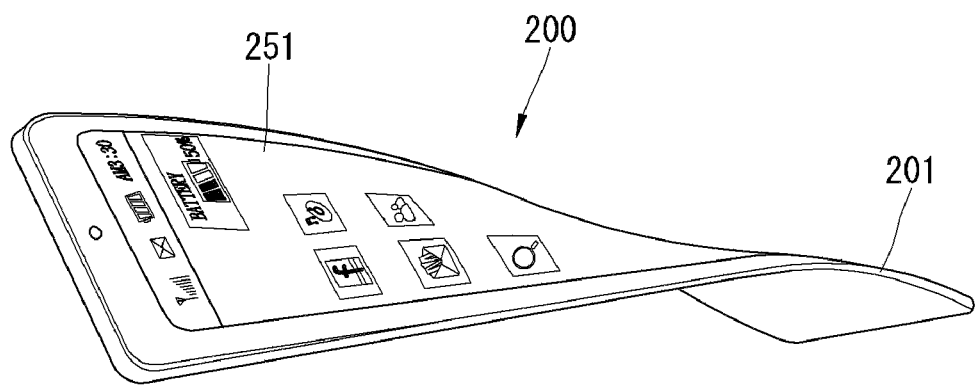
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

FIG. 3 is a flowchart illustrating an operation of the mobile terminal according to an embodiment of the present invention.

Referring to FIG. 3, the controller 180 of the mobile terminal 100 may indicate a state of an application through an icon corresponding to the application. Accordingly, a user can recognize the state of the application before execution of the application and/or by viewing the icon displayed on a home screen.

The controller may enter a display state of the home screen displaying at least one icon (S10).

At least one icon can be displayed on the home screen. Each icon may correspond to a specific application. That is, when an icon is selected, a specific application corresponding thereto can be executed.

The home screen may be displayed in various environments. For example, when power is newly applied and/or the display 151 is turned on in a sleep state and when execution of a specific application is finished, the home screen can be displayed.

The controller 180 may detect a state of an application corresponding to a specific icon (S20).

The state of the application may be related to a state of the mobile terminal 100. The state of the application may be related to a state of a device that constitutes the mobile terminal 100. The state of the application may be related to an operating state of an application executed in the mobile terminal 100. For example, in the case of an application for capturing images using the camera 121 of the mobile terminal 100, the controller 180 can detect a current state of the camera 121. In other words, the controller 180 can detect whether the camera 121 is in a front capture state or a rear capture state, a filter applied to photographing using the camera 121, and the like. As another example, the controller 180 may detect a state of a web surfing application installed in the mobile terminal 100. That is, the controller 180 can detect a state in which execution of the web surfing application has been finished, and the like.

The controller 180 may display the icon corresponding to the application in such a manner that the icon indicates the state of the application (S30).

When the icon corresponding to the application indicates the state of the application, a user can easily recognize a start state of the application by selecting the icon will be started, by viewing the icon. For example, when a photographing icon is selected to drive the camera 121, the user can recognize whether the camera 121 is in a front capture mode, a rear capture mode, a still image capture mode or a video capture mode by viewing the display state of the icon.

Figure 4:
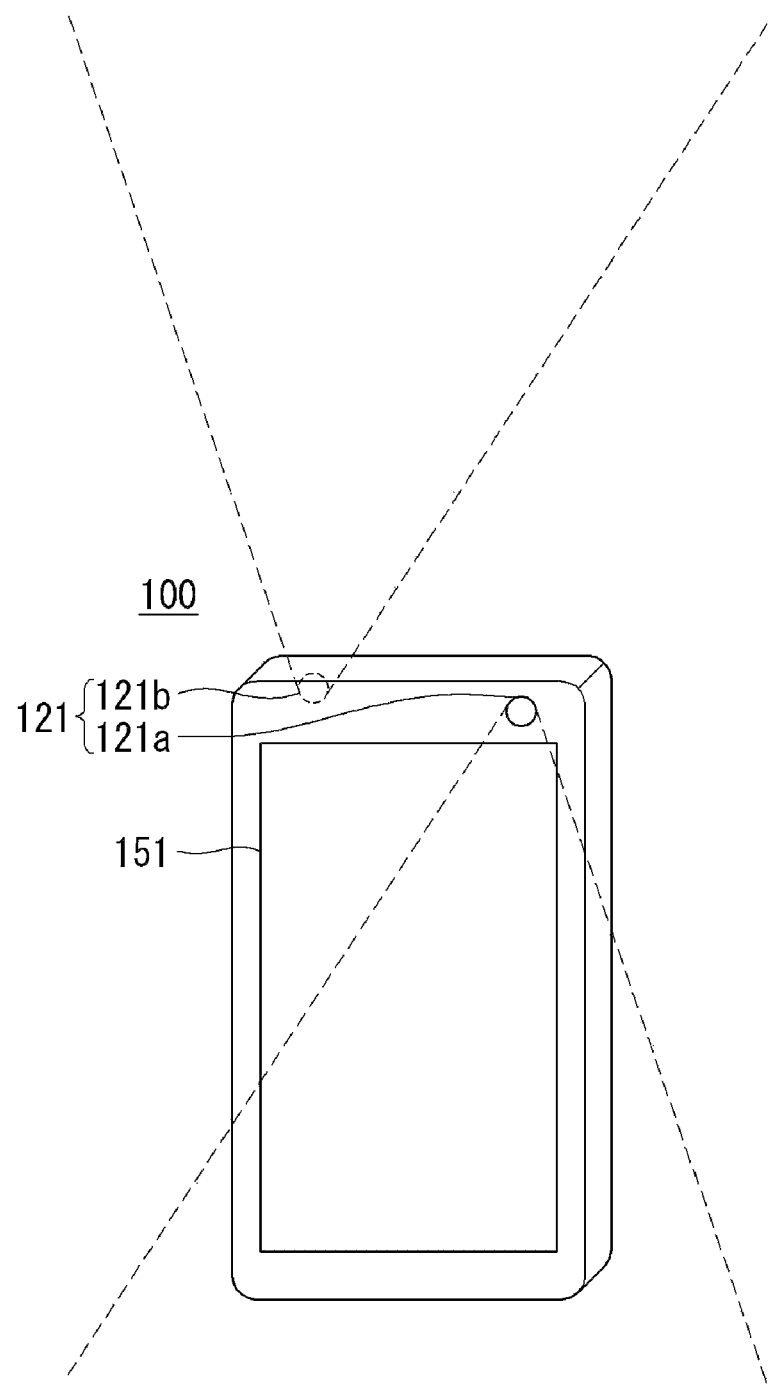
FIGS. 4 and 5 illustrate an operation of the mobile terminal camera shown in FIG. 3.
Figure 5:
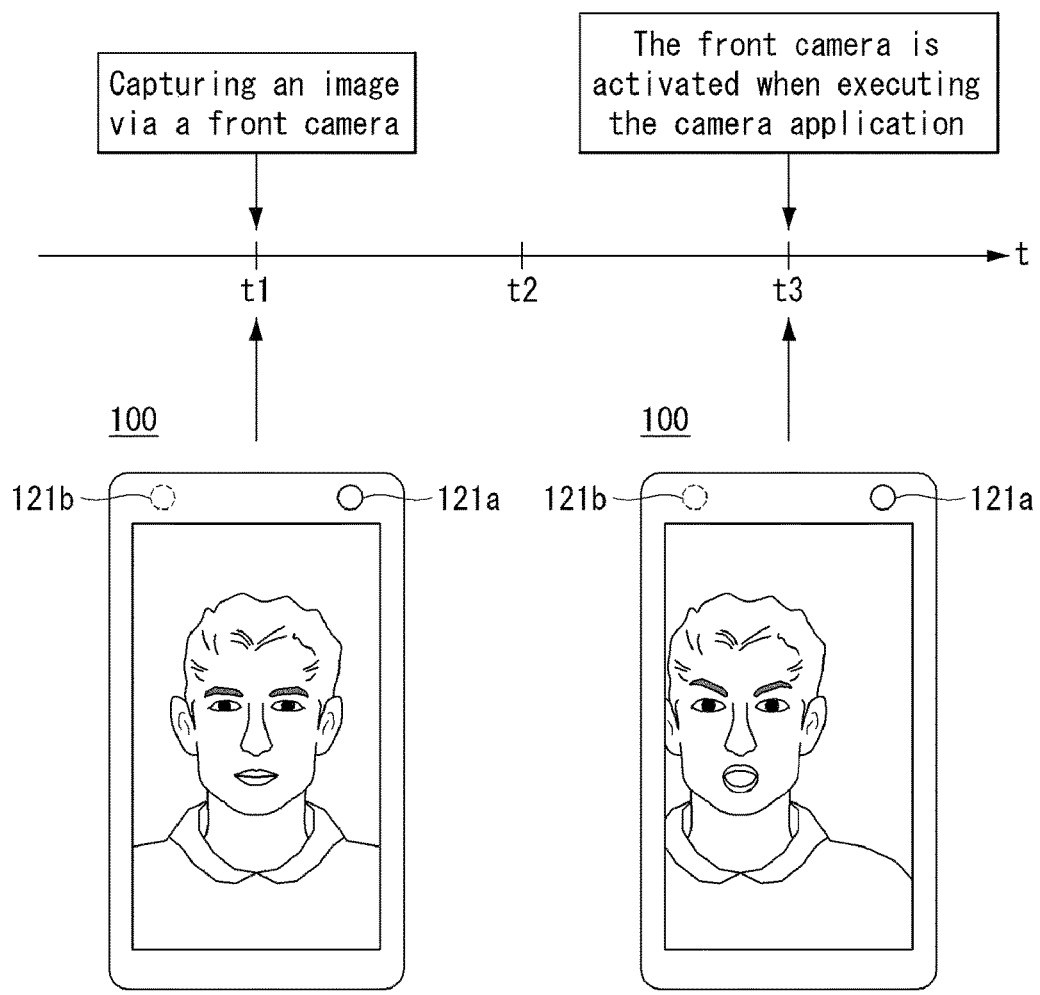

FIGS. 4 and 5 illustrate an operation of the mobile terminal shown in FIG. 3.

As shown, the mobile terminal 100 according to an embodiment of the present invention may include a plurality of cameras 121.

Referring to FIG. 4, a front camera 121a and a rear camera 121b may be respectively provided to the front and back of the mobile terminal 100. In general, the front camera 121a can be used for the user of the mobile terminal 100 to take a selfie and the rear camera 121b can be used to capture external objects such as other people.

Referring to FIG. 5, an image can be captured using the front camera 121a at a time t1. That is, an image of the user of the mobile terminal 100 can be captured using the front camera 121a.

A camera application can be ended at a time t2.

The camera application can be executed again at a time t3. The camera application can operate one of the front camera 121a and the rear camera 121b according to a previous setting value. For example, when the front camera 121a is used at the time t1 and then the camera application is ended at the time t2 without changing the camera mode, the front camera 121a can be operated again at the time t3.

When the front camera 121a is operated at the time t3, the user of the mobile terminal 100 may be embarrassed because of an unexpected capture direction. For example, an image of the user manipulating the mobile terminal 100 is unexpectedly captured by the front camera 121a, and thus the user may be embarrassed. Furthermore, the user may need to perform additional manipulation to operate the rear camera 121b instead of the front camera 121a.

Figure 6:
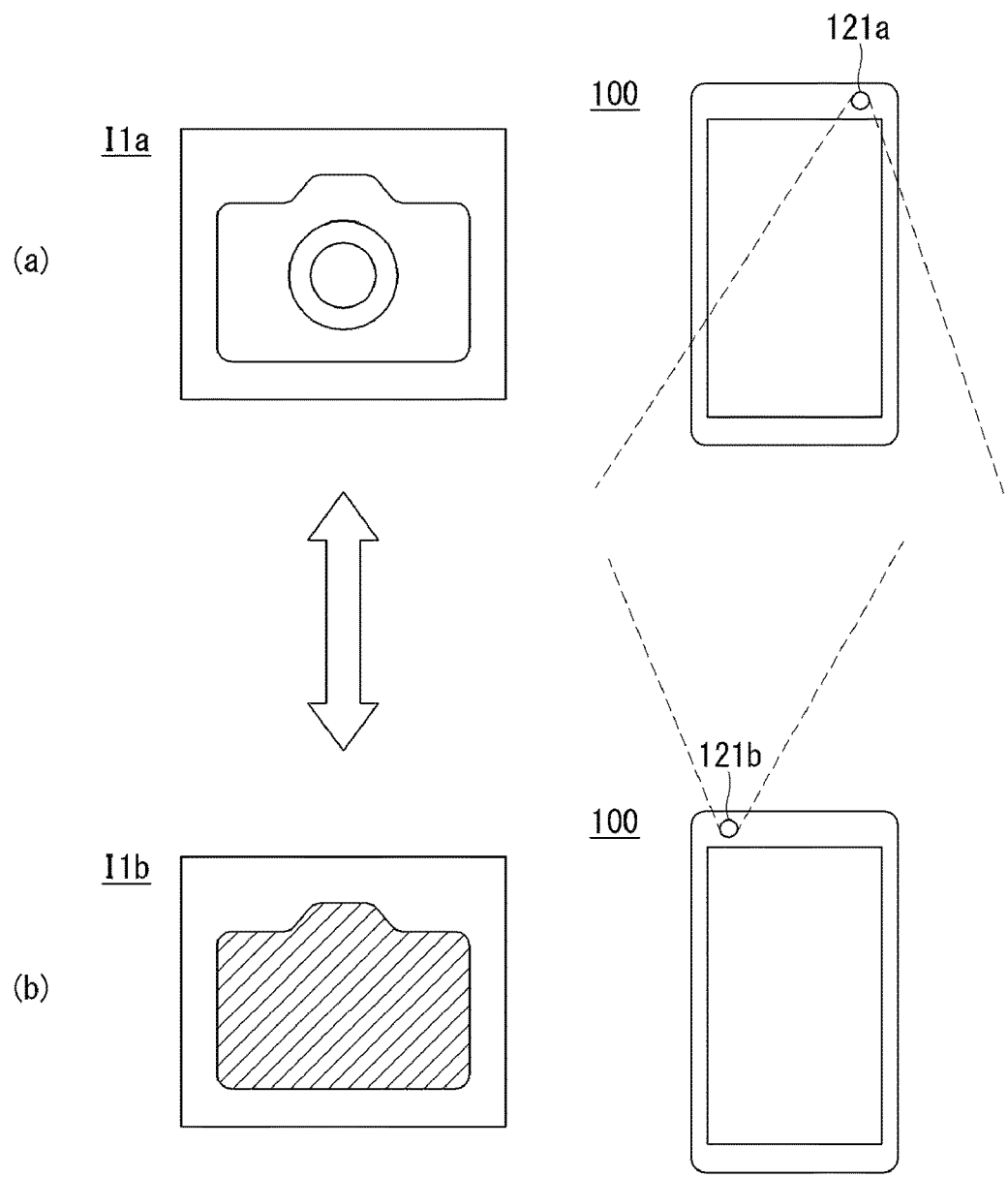
FIGS. 6, 7 and 8 illustrate display states of an icon corresponding to the mobile terminal camera shown in FIG. 3.
Figure 7:
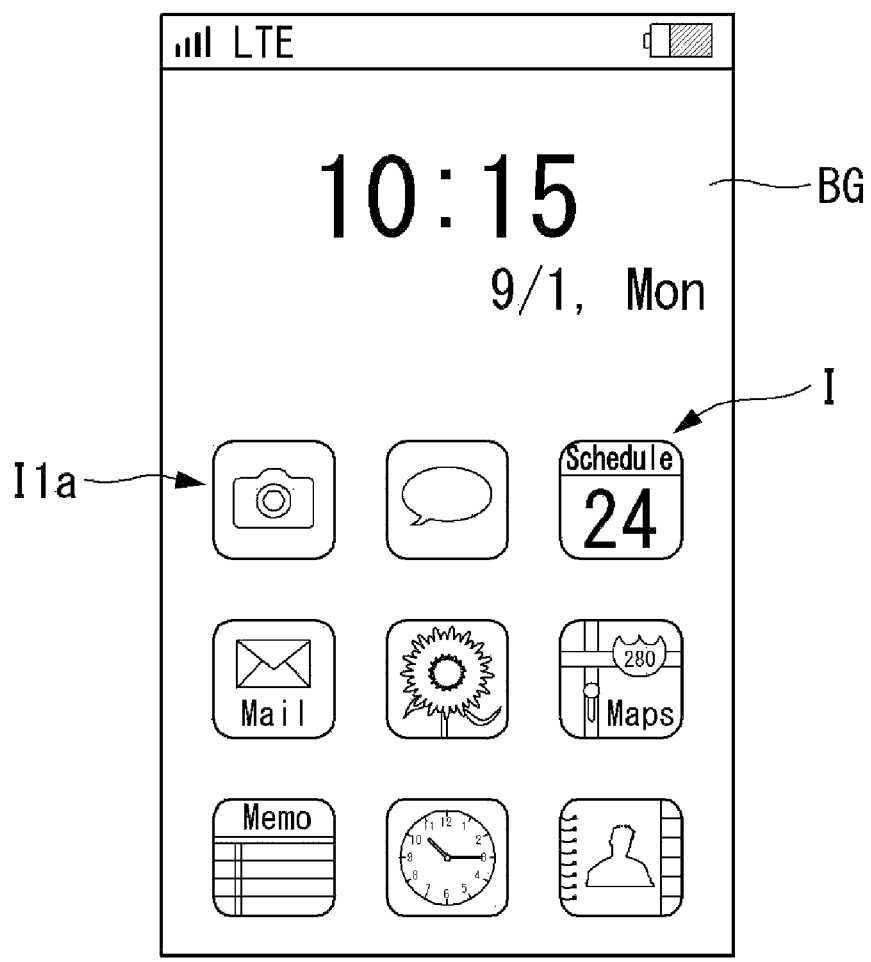
Figure 8:
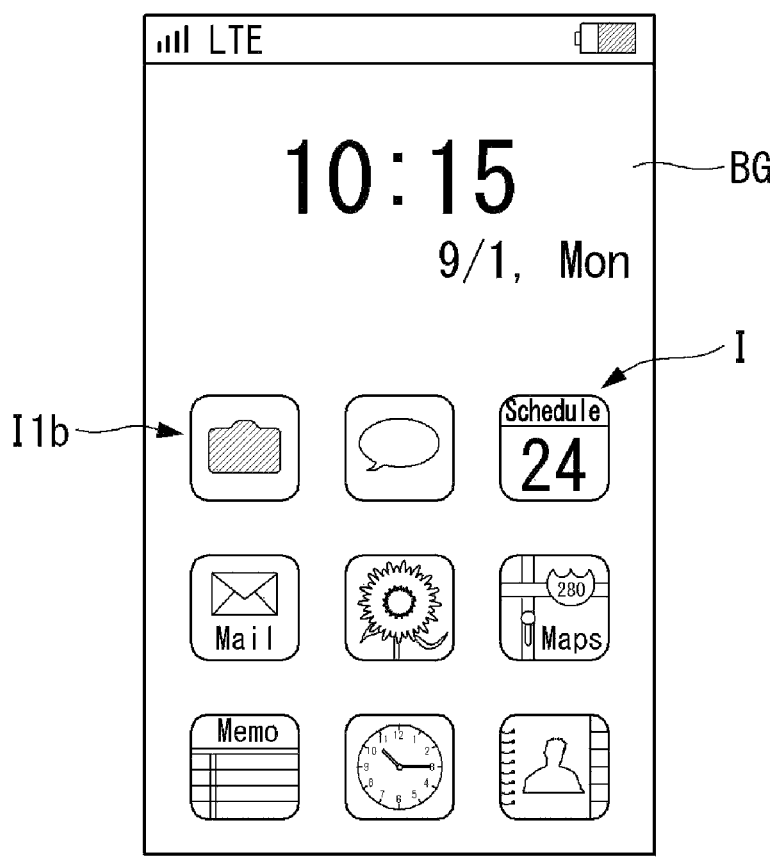

FIGS. 6, 7 and 8 illustrate display status of an icon corresponding to the mobile terminal camera shown in FIG. 3.

As shown, the controller 180 of the mobile terminal 100 according to an embodiment of the present invention can indicate a current state of the mobile terminal 100 through the icon.

Referring to FIG. 6(a), the mobile terminal 100 may be in a state in which the front camera 121a is in an activation stand-by state. For example, when operation of capturing an image using the front camera 121a has been performed immediately before the current operation, the front camera 121a can be activated upon execution of the camera application.

The controller 180 can display a first icon I1a when the front camera 121a is in the activation stand-by state. The first icon I1a may be an icon representing that lens of the camera faces forward. Accordingly, the user can intuitively recognize that the front camera 121a will be operated when the camera application is executed in the current state.

Referring to FIG. 6(b), when the rear camera 121b of the mobile terminal 100 is in the activation stand-by state, the controller 180 can display a second icon I1b. The second icon I1b may take a shape corresponding to the rear shape of a general camera. Accordingly, the user can intuitively recognize that the rear camera 121b will be activated when the camera application is executed when viewing the second icon I1b.

Referring to FIG. 7, the display 151 may display a home screen BG. The home screen BG may display icons I corresponding to applications. The displayed icons may include an icon related to the camera 121.

The controller 180 can display the first icon I1a corresponding to the camera 121. The first icon I1a may indicate a general camera lens. Accordingly, the user can intuitively recognize that photographing will be performed in a direction in which the camera lens faces the user when viewing the first icon I1a. That is, the user can recognize that the front camera 121a of the mobile terminal 100 will be activated.

Referring to FIG. 8, the display 151 may display the home screen BG. The controller 180 can change the icon related to the camera 121 such that the icon corresponds to the current camera state when displaying the icon. For example, the controller 180 can display the second icon I1b representing the rear shape of a general camera. Upon display of the second icon I1b, the user can intuitively recognize that photographing will be performed with the camera lens facing forward. That is, the user can recognize that the rear camera 121b of the mobile terminal 100 will be activated.

FIGS. 9 to 19 illustrate manipulation with respect to the mobile terminal camera shown in FIG. 3 and the icon corresponding thereto.

As shown, the controller 180 of the mobile terminal 100 according to an embodiment of the present invention can indicate a current state of the camera 121 constituting the mobile terminal through the shape of the icon corresponding to the camera 121.

Figure 9:
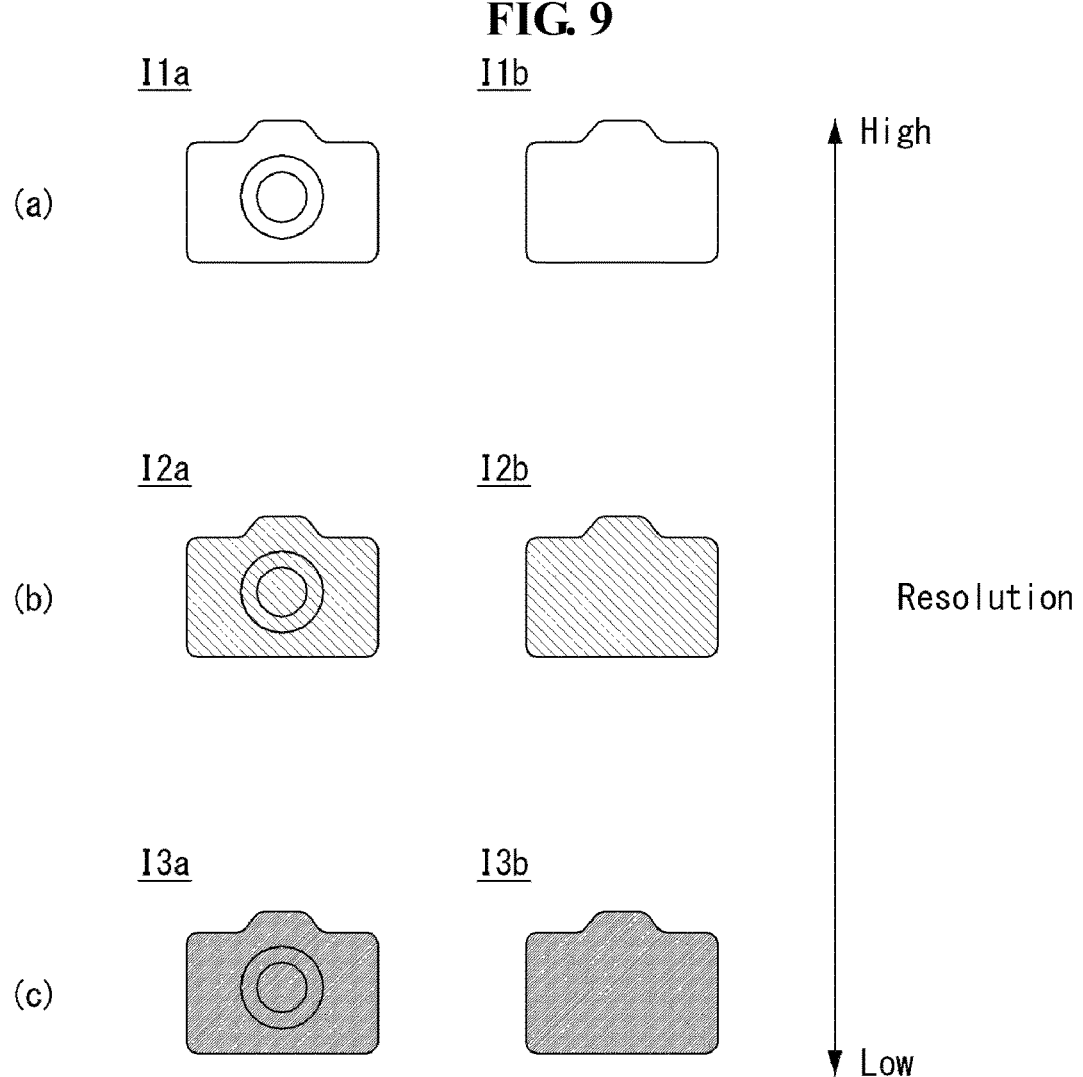

As shown in FIG. 9, the controller 180 can change icon display state according to resolution of the camera 121. For example, the controller 180 can clearly display the first or second icon I1a or I1b when the resolution of the camera 121 is high, as shown in FIG. 9(a).

When the resolution of the camera 121 is changed, the controller 180 can change the definition of the first or second icon I1a or I1b in response to the resolution change. For example, the controller 180 can reduce the definition of the first or second icon I1a or I1b in response to a decrease in the resolution of the camera 121, as shown in FIGS. 9(b) and 9(c). Accordingly, the user can intuitively recognize the current resolution of the camera 121 by viewing the definition of the first or second icon I1a or I1b.

Referring to FIG. 10, the controller 180 can change display of the icon according to the operating mode of the camera 121. For example, the controller 180 can display the first icon I1a taking a general camera shape in the still image capture mode, as shown in FIG. 10(a), and display the second icon I2a taking a projector shape in the video capture mode, as shown in FIG. 10(b). Accordingly, the user can intuitively recognize the current state of the camera on the basis of the icon shape varied according to photographing mode, distinguished from the conventional method through which the photographing mode is recognized after execution of the camera application upon selection of the corresponding icon.

Referring to FIG. 11, the controller 180 can execute a function depending on the size of a displayed icon.

Referring to FIG. 11(a), the controller 180 can display the first icon I1a. Upon selection of the first icon I1a, the controller 180 can operate the front camera 121a.

Referring to FIG. 11(b), the user can manipulate the displayed first icon I1a. For example, the user can change the size of the displayed first icon I1a using first and second fingers F1 and F2.

Referring to FIG. 11(c), the first icon I1a can be changed to the second icon I2a having a different size.

The controller 180 can perform different operations according to touch points of the user when the first icon I1a is changed to the second icon I2a. For example, the controller 180 can operate the front camera 121a when a first region A1 is touched and operate the rear camera 121b when a second region A2 is touched. That is, even in the case of one icon, different operations can be performed according to selected portions of the icon.

Referring to FIG. 12, the controller 180 can display different pieces of information as a icon size is changed.

Referring to FIG. 12(a), the user can touch the displayed first icon I1a. For example, the user can change the size of the first icon I1a using the first and second fingers F1 and F2.

Referring to FIG. 12(b), upon change of the icon size, the controller 180 can display information corresponding to the changed size. For example, when the first icon I1a is changed to the second icon I2a having a different size, related information RI corresponding to the size of the second icon I2a can be displayed.

The related information RI may be information about the current state of the camera 121. For example, the related information RI can include at least one of information about a camera to be operated between the front camera and the rear camera, resolution, filter type applied to the camera and a shutter speed.

Figure 13:
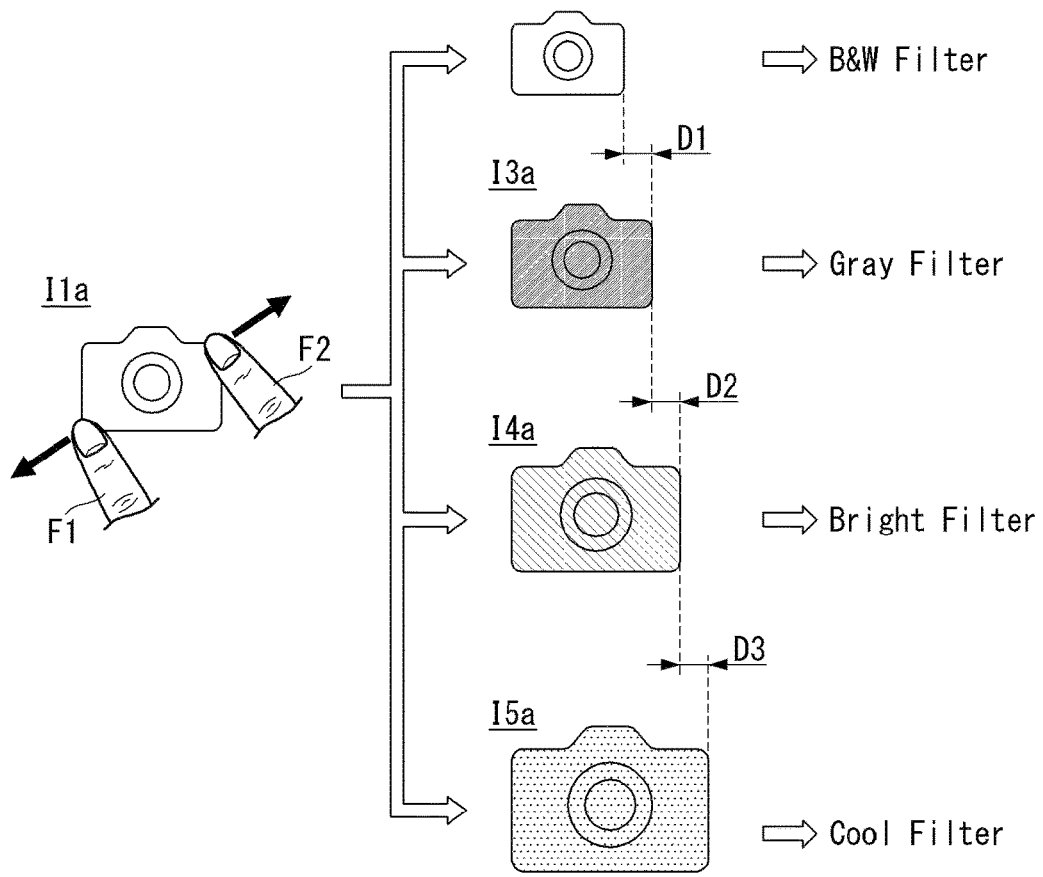

Referring to FIG. 13, the controller 180 can change operating state of an application as the size of an icon corresponding to the application is changed.

The user can touch the displayed first icon I1a. For example, the user can perform touch operation of changing the size of the first icon I1a using the first and second fingers F1 and F2.

The controller 180 can change the type of a filter to be applied to the camera as the first icon I1a is changed to the second to fifth icons I2a to I5a having different sizes. Accordingly, inconvenience of changing a filter after execution of the camera application can be eliminated.

The controller 180 can change colors of the second to fifth icons I2a to I5a according to filter type. For example, the controller 180 can indicate color change, which may occur when a filter corresponding to an icon size is applied, through the corresponding icon.

Figure 14:
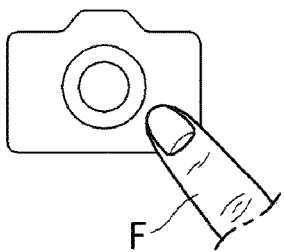

Referring to FIG. 14, the controller 180 can execute different functions according to the number and/or types of touches applied to the icon. For example, when the first icon I1a is touched once, the controller 180 can execute the camera application corresponding to the first icon I1a. When the first icon I1a is touched twice, the controller 180 can change the camera to a first setting value. When the first icon I1a is touched three times, the controller 180 can change the camera to a second setting value.

The first and second setting values may be predetermined by the user and/or the controller 180. For example, the first and second setting values can be setting values including the type of a predetermined filter, resolution, shutter speed and the like. Since camera setting can be changed by simply touching the icon, manipulation of the mobile terminal 100 can be simplified.

Referring to FIG. 15, an execution state of an application corresponding to a displayed icon can be changed through user touch applied to the icon.

Referring to FIG. 15(a), the first icon I1a may be displayed. The first icon I1a can correspond to a state in which an image is captured using the front camera 121a.

Referring to FIG. 15(b), the user can perform touch operation on the displayed first icon I1a. The touch operation may be operation of swiping the first icon I1a using a finger F.

Referring to FIG. 15(c), the controller can change the first icon I1a to the second icon I1b in response to the touch operation of the user. The second icon Ib1 may be an icon corresponding to a state in which an image is captured using the rear camera 121b. That is, when the second icon Ib1 is selected, the controller 180 can start to capture an image using the rear camera 121b.

Figure 16:
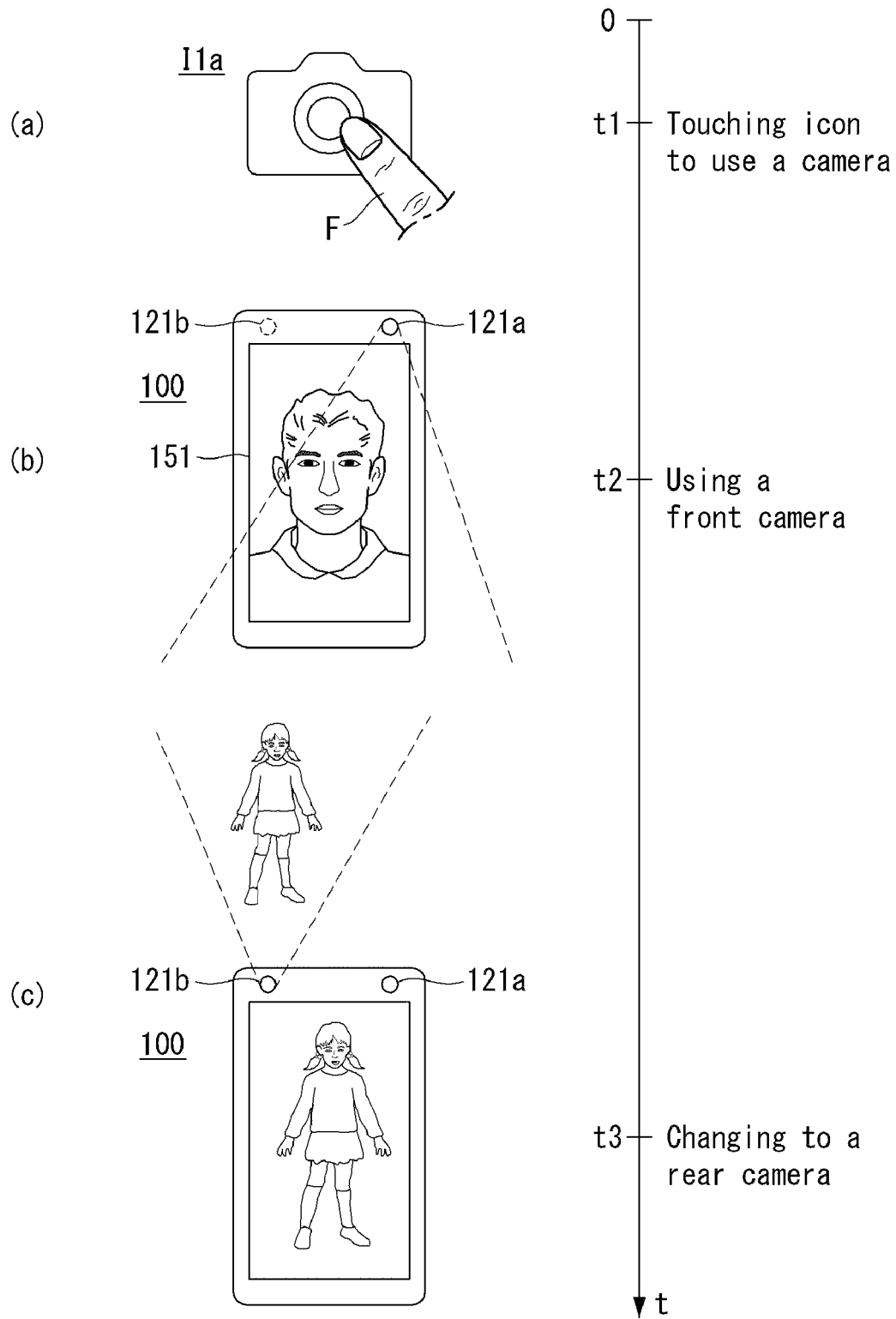
Figure 17:
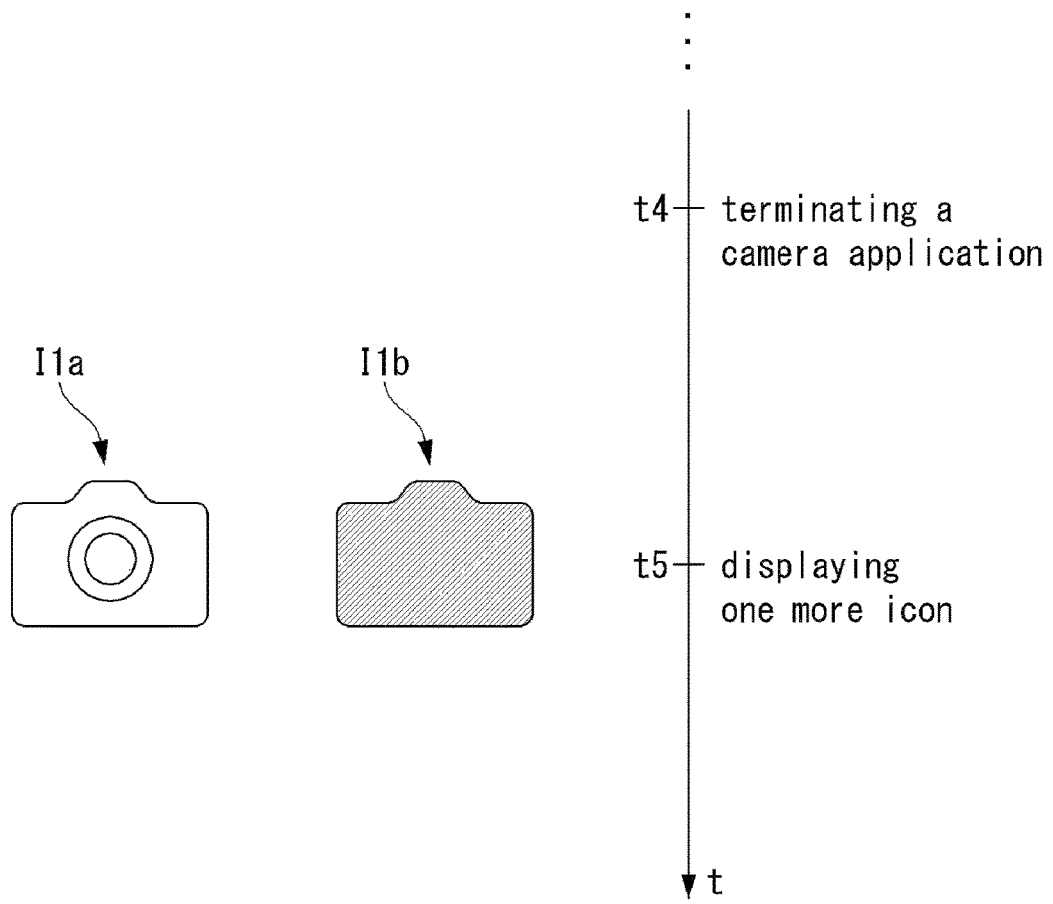

FIGS. 16 and 17, the controller 180 of the mobile terminal 100 according to an embodiment of the present invention can display an additional icon corresponding to a changed state of a specific application.

Referring to FIG. 16(a), the user can operate the camera by selecting the first icon I1a at a time t1.

Referring to FIG. 16(b), when the user selects the first icon I1a at a time t2, the controller 180 can operate the front camera 121*a*. That is, an image of the user holding the mobile terminal 100 can be captured using the front camera 121*a*.

Referring to FIG. 16(*c*), the user can change the state of the camera application such that the rear camera 121*b* is operated at a time t3. That is, a frontal image of the user can be captured using the rear camera 121*b*.

Referring to FIG. 17, the user can terminate the camera application at a time t4. That is, photographing operation using the rear camera 121*b* is terminated.

Referring to FIG. 17(*a*), at a time t5 when the camera application has been terminated, the controller 180 can display the second icon Ib1 in addition to the first icon I1*a* displayed prior to execution of the camera application.

The first icon I1*a* may correspond to a default setting value of the camera. For example, a default setting state can correspond to execution of the camera application using the front camera 121*a*.

When default setting is changed by manipulation of the user, the controller 180 can additionally display an icon representing a changed value. For example, the controller 180 can additionally display the second icon I1*b* indicating photographing using the rear camera 121*b*, which is different from the default setting. Accordingly, the user can select the first icon I1*a* when they want to operate the front camera 121*a* according to the default value and select the second icon I1*b* when they want to operate the rear camera 121*b*. The first and second icons I1*a* and I1*b* may take different shapes and thus the user can intuitively recognize states through the icons corresponding thereto.

Referring to FIG. 18, the controller 180 can display related icons as a group. That is, the controller 180 can display related icons in a group such that the user can intuitively recognize a group of different states of related functions from the icon group.

Referring to FIG. 18(*a*), the first and second icons I1*a* and I1*b* can be displayed. The first and second icons I1*a* and I1*b* may be icons respectively corresponding to different states of the camera.

Referring to FIG. 18(*b*), the controller 180 can display the first and second icons I1*a* and I1*b* in the form of a group of icons. For example, the controller 180 can display a tray T including the first and second icons I1*a* and I1*b*.

The user can perform touch operation of turning the tray T using a finger F. For example, the user can touch and swipe one side of the tray T.

Referring to FIG. 18(*c*), the controller 180 can change icon positions on the tray T in response to the touch operation of the user. For example, while the first icon I1*a* was positioned before the second icon I1*b* prior to the touch operation, the second icon I1*b* can be positioned before the first icon I1*a* after the touch operation.

Figure 19:
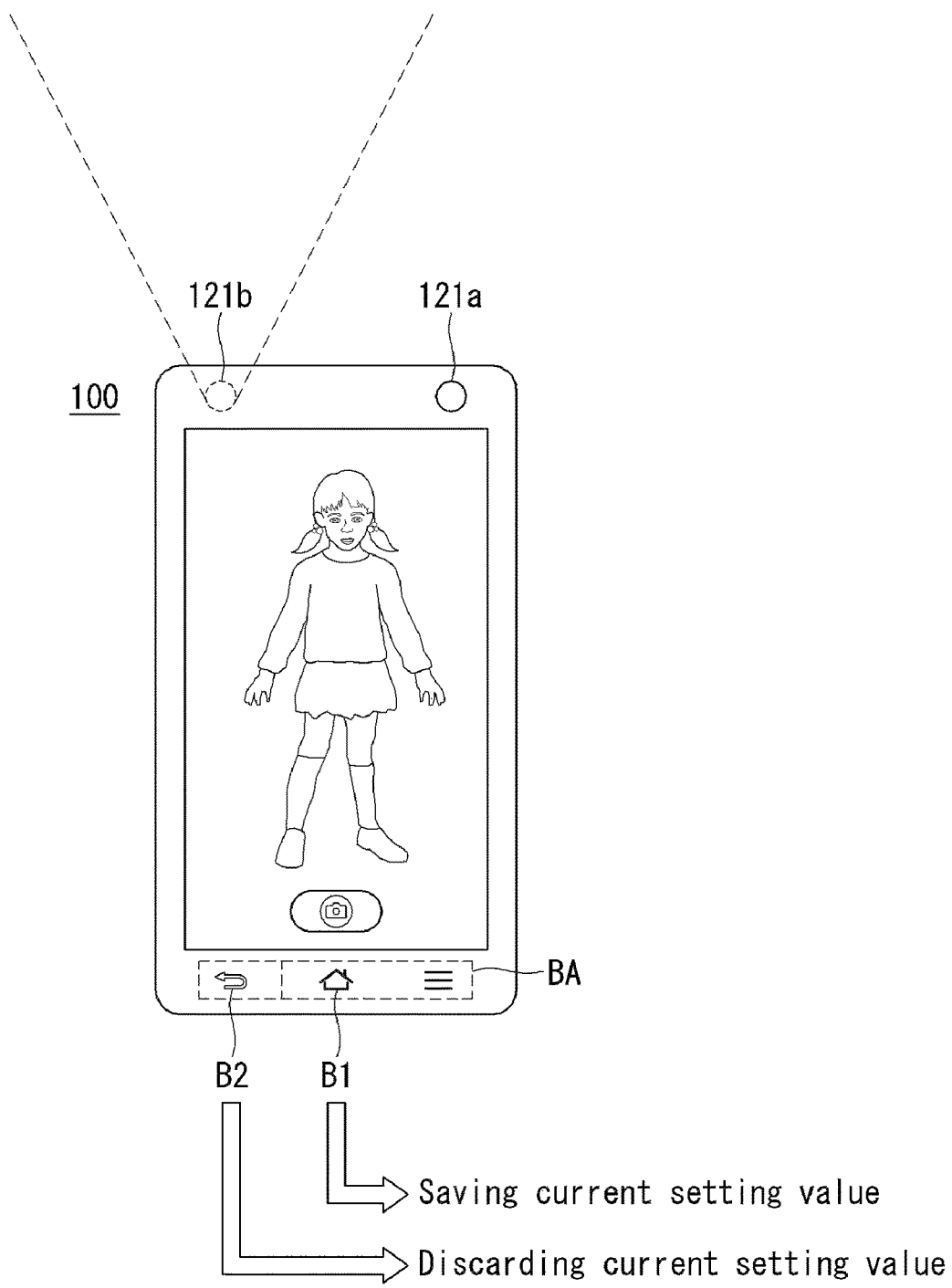
Figure 22:
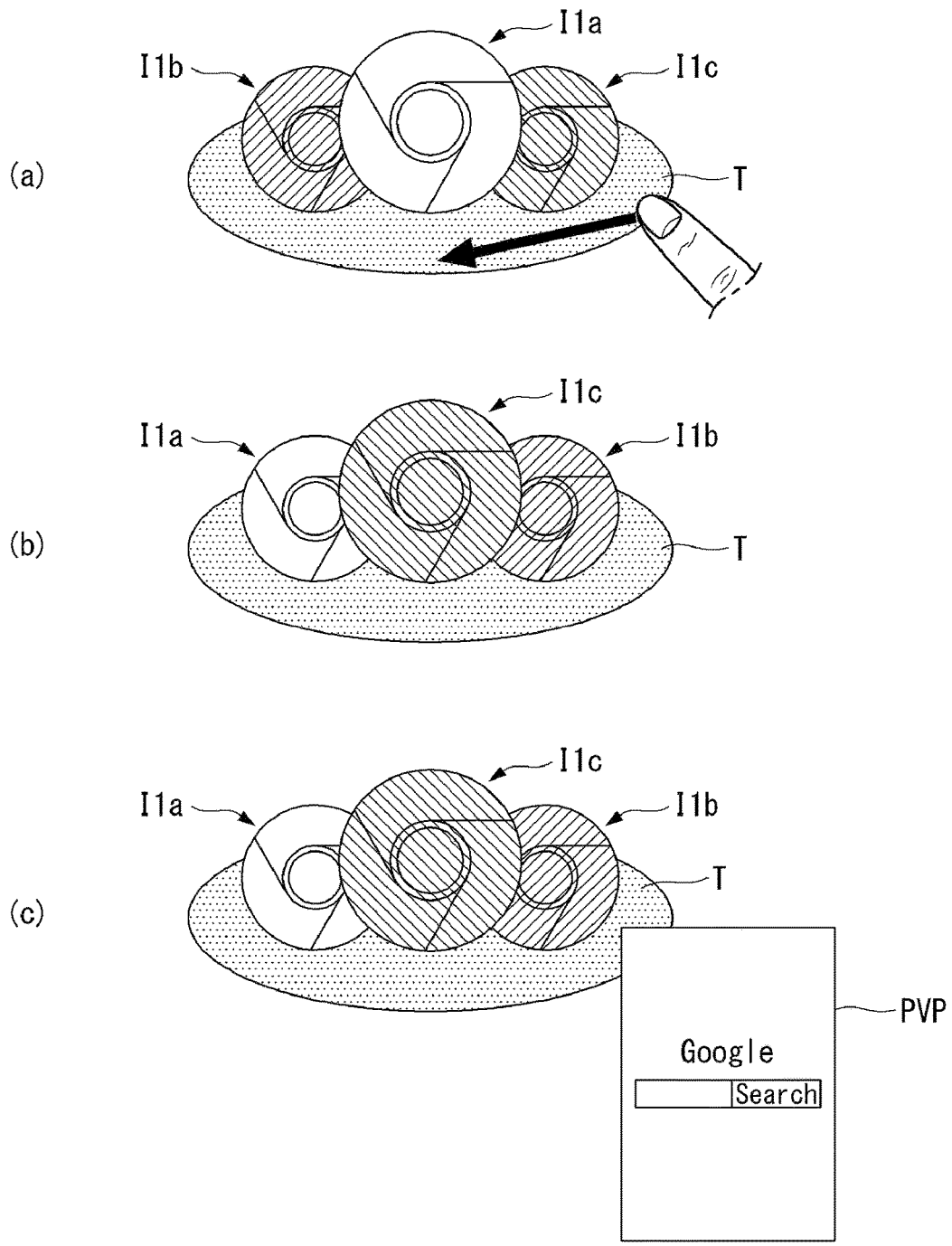

Referring to FIG. 19, the controller 180 can perform different operations according to termination types of a specific application. In other words, the controller can store a changed setting value or not according to application termination type. For example, buttons B may be provided to the mobile terminal 100. The buttons B may include a home button B1 and a return button B2.

When the user selects the home button B1, the controller 180 can terminate the currently executed application and display the home screen. The controller 180 can store a current setting value of the camera upon selection of the home button B1. If the camera is operated later, the controller 180 can operate the camera on the basis of the stored value. For example, the controller 180 can change a photographing direction of the camera, a filter included in the camera, resolution thereof, etc. on the basis of the setting value when the home button B1 is pressed and operate the camera.

When the user selects the return button B2, the controller 180 can terminate the currently executed application. The controller 180 can discard the current camera setting value upon selection of the return button B2. That is, the controller 180 can terminate the operation of the camera without storing the current camera setting value. Accordingly, when the camera is operated later, the camera can operate on the basis of the initial default setting value.

FIGS. 20 to 23 illustrate an operation corresponding to another application of the mobile terminal shown in FIG. 3.

As shown, the mobile terminal 100 according to an embodiment of the present invention can indicate states of an application through an icon in various manners.

Referring to FIG. 20(*a*), the first icon I1*a* may correspond to a web surfing application. That is, upon selection of the first icon I1*a*, the web surfing application can be displayed on the display 151.

The controller 180 can display a blank page BP that is not linked to a specific webpage upon selection of the first icon I1*a*. When the blank page BP of the web surfing application is displayed, the user can input a web address for web surfing into the blank page BP.

Referring to FIG. 20(*b*), the second icon I1*b* may be provided. The second icon I1*b* may correspond to the web surfing application. That is, the web surfing application can be displayed upon selection of the second icon I1*b*.

The controller 180 can display a specific page HP upon selection of the second icon I1*b*. That is, the blank page BP is not displayed. The specific page HP may be a page that was previously viewed by the user. For example, the specific page HP may be a webpage that was accessed using the web surfing application.

The second icon I1*b* may be displayed differently from the first icon I1*a*. That is, at least one of the color, shape and size of the second icon I1*b* can differ from that of the first icon I1*a* although the user can intuitively recognize that the second icon I1*b* is related to the web surfing application.

Referring to FIG. 21, icons can be displayed in various forms.

Referring to FIG. 21(*a*), an icon can be displayed differently according to states of an application corresponding to the icon. For example, the first icon I1*a* can correspond to a first webpage, the second icon I1*b* can correspond to a second webpage and a third icon I1*c* can correspond to a third webpage. While the overall forms of the first, second and third icons I1*a*, I1*b* and I1*c* are similar, at least one of the colors, shapes and sizes thereof may be different. Accordingly, the user can intuitively recognize that the web surfing application is executed upon selection of the icons and that the first, second and third icons I1*a*, I1*b* and I1*c* respectively correspond to different webpages.

Referring to FIG. 21(*b*), the icons can be displayed in the form of an icon group. That is, a plurality of icons corresponding to the same attribute and/or the same application can be displayed as a group. For example, the first, second and third icons I1*a*, I1*b* and I1*c* may be icons corresponding to the web surfing application. The first, second and third icons I1*a*, I1*b* and I1*c* may respectively correspond to different webpages. When new icons are generated according to operation of the user and/or control operation of the controller 180, the controller 180 can display the generated icons as a group. The controller 180 can display the icons in a region taking the form of a tray such that the user can intuitively recognize that the icons are grouped.

Referring to FIG. 22(a), the user can manipulate the first, second and third icons I1a, I1b and I1c grouped in the tray T. For example, the user can perform swiping touch operation starting at one side of the tray T.

Referring to FIG. 22(b), the controller 180 can change icon positions in response to the touch operation of the user. For example, the controller 180 can move the third icon I1c, which was positioned behind the first icon I1a before the touch operation, such that the third icon I1c is positioned in front. This operation may provide a more intuitive usage environment since a plurality of icons is positioned in a tray-shaped region. That is, since icons are positioned in a region taking the form of a tray T that can be turned, the user can easily manipulate the icons.

Referring to FIG. 22(c), the controller 180 can display information corresponding to the icon positioned in front of other icons. For example, when the third icon I1c is positioned in front of other icons in the tray T, an information window PVP can be displayed. The information window PVP can display the content of a webpage corresponding to the third icon I1c in the form of a preview image.

Referring to FIG. 23(a), the user can touch the first icon I1a using a finger F. The controller 180 can perform different operations according to properties of touch operation. For example, the controller 180 can execute the application related to the corresponding icon upon input of one-time slight touch. The controller 180 can display a menu for setting a function of the icon upon input of long touch.

Referring to FIG. 23(b), the controller 180 can display a menu for setting a function corresponding to specific touch operation applied to the first icon I1a. For example, the controller 180 can execute a function of initializing a stored webpage, setting a secret mode such that the corresponding webpage can be accessed only when a password or the like is input, or generating a new tray corresponding to new icon groups.

FIG. 24 illustrates an operation corresponding to another application of the mobile terminal shown in FIG. 3.

As shown, the controller 180 of the mobile terminal 100 according to an embodiment of the present invention can generate icons corresponding to setting values of various external devices.

Referring to FIG. 24(a), a first icon I1a through which a manipulation application for an external device 200 can be executed may be provided. For example, the user can execute a remote controller application for operating the external device 200 by selecting the first icon I1a.

Referring to FIG. 24(b), a setting value ST that is preferred by the user for the specific external device 200 or finally used may be present. For example, when the external device 200 is an air-conditioner, a preferred temperature and speed can be present. The controller 180 can store the specific setting value ST.

The controller 180 can display a second icon I1b indicating that the specific setting value ST has been stored. The second icon I1b can have a form similar to the first icon I1a such that the user can intuitively recognize that the second icon I1b and the first icon I1a relate to the same function. However, at least one of the color, size and additional indication of the second icon I1b may be different from that of the first icon I1a such that the user can intuitively recognize that the external device 200 is operated with the specific setting value ST upon selection of the second icon I1b.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distributed fashion.

A mobile terminal may include a first touch screen configured to display a first object, a second touch screen configured to display a second object, and a controller configured to receive a first touch input applied to the first object and to link the first object to a function corresponding to the second object upon receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display;
a front camera;
a rear camera;
an input unit comprising a home button and a return button; and
a controller operably coupled to the display, the front camera, and the rear camera and configured to:

cause the display to display a home screen;
cause the display to display a first icon in a specific region of the home screen, wherein the first icon corresponds to a camera application in a first execution state, and wherein the camera application is used to capture an image via the front camera in the first execution state;
cause the display to display a second icon in response to a first touch input received via the specific region such that the second icon is positioned in the specific region of the home screen, wherein the first touch input comprises swiping the first icon displayed in the specific region, wherein the second icon corresponds to the camera application in a second execution state, and wherein the camera application is used to capture an image via the rear camera in the second execution state;
activate the front camera and execute the camera application in the first execution state in response to a second touch input received via the first icon;
activate the rear camera and execute the camera application in the second execution state in response to a third touch input received via the second icon;
terminate a currently executed camera application and cause the display to display the home screen in response to selection of the home button, wherein a current setting value of the currently executed camera application is stored in response to the selection of the home button;
cause the display to display the second icon in addition to the first icon displayed prior to re-execution of the camera application when the camera application has been terminated;
operate the camera application based on the stored setting value when the camera application is re-executed after the currently executed camera application is terminated in response to the selection of the home button; and
operate the camera application based on an initial default setting value when the camera application is re-executed after the currently executed camera application is terminated in response to selection of the return button,
wherein:
a front icon is positioned at a first position and a rear icon is positioned at a second position;
the front icon is one of the first and second icons, and the rear icon is the other one of the first and second icons;
the controller is further configured to cause the display to display the front icon at the second position and the rear icon at the first position in response to the first touch input;
the first or second execution state of the camera application corresponds to the front or rear icon positioned at the first position;
one of the front and rear icons positioned at the first position has a first size and the other one of the front and rear icons positioned at the second position has a second size; and
the first size is greater than the second size.

2. The mobile terminal of claim 1, wherein the controller is further configured to:
cause the display to display the first and second icons as a group in the specific region of the home screen.

3. The mobile terminal of claim 1, wherein a shape of the first icon is different from a shape of the second icon.

4. The mobile terminal of claim 1, wherein a color of the first icon is different from a color of the second icon.

5. The mobile terminal of claim 1, wherein the controller is further configured to cause the display to display a tray in the specific region of the home screen, and
wherein the second icon is displayed in front of the tray and the first icon is displayed in front of the second icon.

6. The mobile terminal of claim 1, wherein the first icon is overlapped with the second icon.

7. The mobile terminal of claim 1, wherein the controller is further configured to cause the display to display information corresponding to a current execution state of the camera application in response to a fourth touch input applied to the specific region.

8. The mobile terminal of claim 1, wherein a portion of the second icon is covered by the first icon.

9. The mobile terminal of claim 1, wherein the currently executed application is terminated without storing the current setting value when the return button is selected instead of the home button.

10. A method for controlling a mobile terminal comprising a front camera and a rear camera, the method comprising:
displaying a home screen on a display of the mobile terminal;
displaying a first icon in a specific region of the home screen, wherein the first icon corresponds to a camera application in a first execution state, and wherein the camera application is used to capture an image via the front camera in the first execution state;
displaying a second icon in response to a first touch input received via the specific region such that the second icon is positioned in the specific region of the home screen, wherein the first touch input comprises swiping the first icon displayed in the specific region, wherein the second icon corresponds to the camera application in a second execution state, and wherein the camera application is used to capture an image via the rear camera in the second execution state;
activating the front camera and executing the camera application in the first execution state in response to a second touch input received via the first icon;
activating the rear camera and executing the camera application in the second execution state in response to a third touch input received via the second icon;
terminating the currently executed camera application and displaying the home screen on the display upon selection of the home button;
storing a current setting value of the camera application upon the selection of the home button;
displaying the second icon in addition to the first icon displayed prior to re-execution of the camera application when the camera application has been terminated;
operating the camera application on the basis of the stored value when the camera application is re-operated later; and
operating the camera application on the basis of the initial default setting value when the camera application is terminated by the return button and re-operated later,
wherein:
a front icon is positioned at a first position and a rear icon is positioned at a second position;
the front icon is one of the first and second icons, and the rear icon is the other one of the first and second icons;

the controller is further configured to cause the display to display the front icon at the second position and the rear icon at the first position in response to the first touch input;

the first or second execution state of the camera application corresponds to the front or rear icon positioned at the first position;

one of the front and rear icons positioned at the first position has a first size and the other one of the front and rear icons positioned at the second position has a second size; and the first size is greater than the second size.

11. The method of claim 10, further comprising:
displaying the first and second icons as a group in the specific region of the home screen.

12. The method of claim 10, wherein a shape of the first icon is different from a shape of the second icon.

13. The method of claim 10, wherein a color of the first icon is different from a color of the second icon.

14. The method of claim 10, further comprising:
displaying a tray in the specific region of the home screen, wherein the second icon is displayed in front of the tray and the first icon is displayed in front of the second icon.

15. The method of claim 10, wherein the first icon is overlapped with the second icon.

16. The method of claim 10, further comprising:
displaying information corresponding to a current execution state of the camera application in response to a fourth touch input applied to the specific region.

17. The method of claim 10, wherein a portion of the second icon is covered by the first icon.

* * * * *